United States Patent
Song et al.

(10) Patent No.: US 9,729,881 B2
(45) Date of Patent: *Aug. 8, 2017

(54) VIDEO ENCODING/DECODING APPARATUS AND METHOD

(71) Applicant: SK TELECOM CO., LTD., Seoul (KR)

(72) Inventors: Jinhan Song, Seoul (KR); Jeongyeon Lim, Seongnam-si (KR); Jongki Han, Seoul (KR); Yunglyul Lee, Seoul (KR); Joohee Moon, Seoul (KR); Haekwang Kim, Seoul (KR); Byeungwoo Jeon, Seongnam-si (KR); Chanwon Seo, Seoul (KR); Hyoungmee Park, Suwon-si (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/401,752

(22) Filed: Jan. 9, 2017

(65) Prior Publication Data

US 2017/0118472 A1    Apr. 27, 2017

Related U.S. Application Data

(63) Continuation of application No. 13/698,840, filed as application No. PCT/KR2011/003292 on May 3, 2011.

(30) Foreign Application Priority Data

May 19, 2010  (KR) .................. 10-2010-0046828
May 3, 2011   (KR) .................. 10-2011-0041832

(51) Int. Cl.
*H04N 7/12*      (2006.01)
*H04N 19/124*    (2014.01)
(Continued)

(52) U.S. Cl.
CPC ......... *H04N 19/124* (2014.11); *H04N 19/122* (2014.11); *H04N 19/132* (2014.11);
(Continued)

(58) Field of Classification Search
CPC .. H04N 19/124; H04N 19/122; H04N 19/132; H04N 19/159; H04N 19/52; H04N 19/61; H04N 19/176; H04N 19/184
(Continued)

(56) References Cited

U.S. PATENT DOCUMENTS 8,385,416 B2   2/2013  Lu et al.
9,167,254 B2  10/2015  Yamori et al.
(Continued)

FOREIGN PATENT DOCUMENTS

EP       2599308 A1      6/2013
KR   1020020057525 A     7/2002
(Continued)

OTHER PUBLICATIONS

International Search Report mailed Jan. 4, 2012 for PCT/KR2011/003292.
(Continued)

*Primary Examiner* — Francis G Geroleo
*Assistant Examiner* — Richard Carter
(74) *Attorney, Agent, or Firm* — Hauptman Ham, LLP

(57) ABSTRACT

A video decoding apparatus includes: a decoder to determine a size of a minimum block unit among block units in which quantization parameter information is decoded from a bitstream, determine a current block to be decoded by dividing a block larger than 16×16 into one or more blocks, decode, from the bitstream, a skip information and the motion information for deriving the motion vector of the current block without decoding information on residual signals of the current block, and decode, from the bitstream, prediction
(Continued)

information of the current block and quantized transform coefficients of the current block; and a video reconstructor to determine the motion vector of the current block using the decoded motion information, reconstruct residual signals from the quantized transform coefficients by inversely quantizing the quantized transform coefficients using a quantization parameter, and reconstruct the current block based on the prediction information and the reconstructed residual signals.

11 Claims, 9 Drawing Sheets

(51) Int. Cl.
- H04N 19/122 (2014.01)
- H04N 19/132 (2014.01)
- H04N 19/52 (2014.01)
- H04N 19/61 (2014.01)
- H04N 19/159 (2014.01)
- H04N 19/176 (2014.01)
- H04N 19/184 (2014.01)

(52) U.S. Cl.
CPC ........... *H04N 19/159* (2014.11); *H04N 19/52* (2014.11); *H04N 19/61* (2014.11); *H04N 19/176* (2014.11); *H04N 19/184* (2014.11)

(58) Field of Classification Search
USPC .......................... 375/240.03, 240.16, 240.19
See application file for complete search history.

(56) References Cited

U.S. PATENT DOCUMENTS

| 9,445,101 | B2* | 9/2016 | Song | H04N 19/159 |
| 2002/0021758 | A1* | 2/2002 | Chui | G06F 3/0481 |
| | | | | 375/240.19 |
| 2005/0063466 | A1* | 3/2005 | Etoh | H04N 9/8042 |
| | | | | 375/240.16 |
| 2005/0190977 | A1 | 9/2005 | Jeon et al. | |
| 2006/0104527 | A1 | 5/2006 | Koto et al. | |
| 2007/0110327 | A1 | 5/2007 | Han | |
| 2007/0223579 | A1 | 9/2007 | Bao | |
| 2009/0232217 | A1* | 9/2009 | Lee | H04N 19/197 |
| | | | | 375/240.16 |
| 2011/0090967 | A1 | 4/2011 | Chen et al. | |

FOREIGN PATENT DOCUMENTS

| KR | 1020030064332 A | 7/2003 |
| KR | 1020060016947 A | 2/2006 |
| KR | 1020070023478 A | 2/2007 |

OTHER PUBLICATIONS

Tzu-Der Chuang et al., "AhG Quantization: Sub-LCU Delta QP", Joint Collaborative Team on Video Coding (JCT-VC) of ITU-T SG16 WP3 and ISO/IEC JTC1/SC29/WG11, Mar. 2011, 5th Meeting: Geneva, CH, 6 pages.

Jaeil Kim et al., "Englarging MB size for high fidelity video coding beyond HD", Video Coding Experts Group (VCEG), 26th Meeting: San Diego, USA, Oct. 2008, 6 pages.

Marta Karczewicz et al., "Video coding technology proposal by Qualcomm Inc.", Joint Collaborative Team on Video Coding (JCT-VC) of ITU-T SG16 WP3 and ISO/IEC JTC1/SC29/WG11, 1st Meeting: Desden, DE, Apr. 2010, 25 pages.

* cited by examiner

VIDEO ENCODING/DECODING APPARATUS AND METHOD

CROSS-REFERENCE TO RELATED APPLICATIONS

The present application is a continuation of U.S. patent application Ser. No. 13/698,840 filed Nov. 19, 2012, which is a national stage filing under 35 U.S.C §371 of PCT application No. PCT/KR2011/003292, filed May 3, 2011, which is based upon and claims the benefit of priority from Korean Patent Application No. 10-2010-0046828, filed on May 19, 2010 and Korean Patent Application No. 10-2011-0041832, filed on May 3, 2011. The disclosures of the above-listed applications are hereby incorporated by reference herein in their entirety.

TECHNICAL FIELD

The present disclosure relates to a video encoding and/or decoding apparatus and method.

BACKGROUND

The statements in this section merely provide background information related to the present disclosure and not constitute prior art.

Technical standards established for compressing video data presently include H.261, H.263, H.264, MPEG-2, and MPEG-4. According to the existing video compression technologies, encoding each image is carried out after dividing the same into fixedly sized macroblocks which are composed of rectangular 16×16 pixel areas of a luminance or luma component and rectangular 8×8 pixel areas of a chrominance or chroma component. All of the luma and chroma components of the respective macroblocks are spatially or temporally predicted, and the resultant predicted residuals undergo transform, quantization, entropy coding and the like before they are eventually compressed.

An encoding apparatus by the H.264/AVC compression standard subdivides each macroblock into blocks of smaller sizes 16×16, 8×8, and 4×4 to enter an intra prediction encoding wherein 16×16 pixel blocks are processed in one of four prediction modes and 8×8 pixel blocks and 4×4 pixel blocks in one of nine prediction modes. As for an inter prediction encoding, each macroblock may be first divided into blocks of pixel sizes 16×16, 16×8, 8×16, 8×8, 8×4, 4×8, and 4×4 before the inter prediction encoding. Transform is carried out in units of 8×8 or 4×4 pixel blocks, and quantization of transform coefficients utilizes a scalar quantization.

H.264/AVC transmits quantization parameters (QP) in units of a slice or macroblock. Transmitting QP in unit of a slice unit is carried out with differential quantization parameters calculated by using Equation 1.

$$\Delta QP_{slice} = QP_{cur} - 26 - \Delta QP_{PPS} \quad \text{Equation 1}$$

In Equation 1, $QP_{cur}$ is a quantization parameter used in a current slice, and $\Delta QP_{PPS}$ is a differential quantization parameter transmitted to a picture parameter set (PPS). $\Delta QP_{PPS}$ is equal to the subtraction of 26 from a quantization parameter value inputted by a user in encoding, as expressed in Equation 2.

$$\Delta QP_{PPS} = QP_{user} - 26 \quad \text{Equation 2}$$

The quantization parameter transmitted in units of a macroblock encodes a differential value between a quantization parameter value of a previously encoded macroblock and a quantization parameter value of a current macroblock, as expressed in Equation 3.

$$\Delta QP_{MB} = QP_{cur}^{MB} - QP_{prev}^{MB} \quad \text{Equation 3}$$

The quantization parameter transmitted in units of a macroblock is encoded adaptively according to a block type and a coded block pattern (CBP). In the case of intra blocks, with respect to all macroblocks, a differential value of a quantization parameter calculated by Equation 3 is encoded. In the case of inter blocks, a CPB value is checked to determine whether a quantization parameter is encoded. If or when a current macroblock has no quantized transform coefficient data to be decoded, a quantization parameter is not transmitted. If or when there is a CBP, a quantization parameter is transmitted by using Equation 3.

However, an H.264/AVC-based quantization parameter transmission method is designed only with macroblock considered to be the basic encoding unit. The inventor(s) has noted that in line with increasing resolution of videos used for encoding, a basic encoding unit is not limited to a macroblock, and the use of an extended macroblock is considered. The inventor(s) has experience that there is a need for an optimal quantization parameter encoding method suitable for this.

SUMMARY

In accordance with some embodiments of the present disclosure, a video decoding apparatus comprises a decoder and a video reconstructor. The decoder, implemented by one or more processors, is configured to determine a size of a minimum block unit among block units in which quantization parameter information is decoded from a bitstream, determine a current block to be decoded by dividing a block larger than 16×16 into one or more blocks, decode, from the bitstream, a skip information indicating whether or not the current block has been encoded by using a skip mode, wherein the skip mode is a mode where no more other information related to the current block is encoded into the bitstream except motion information for deriving a motion vector of the current block, decode, from the bitstream, the motion information for deriving the motion vector of the current block without decoding information on residual signals of the current block, when the skip information indicates that the current block has encoded using the skip mode, and decode, from the bitstream, prediction information of the current block and quantized transform coefficients of the current block, when the skip information indicates that the current block has not been encoded using the skip mode. And the video reconstructor, implemented by one or more processors, is configured to determine the motion vector of the current block using the decoded motion information and reconstruct, as the current block, a predicted block predicted using the motion vector of the current block, when the skip information indicates that the current block has encoded using the skip mode, and reconstruct residual signals from the quantized transform coefficients by inversely quantizing the quantized transform coefficients using a quantization parameter and reconstruct the current block based on the prediction information and the reconstructed residual signals, when the skip information indicates that the current block has not been encoded using the skip mode. Herein, when a size of the current block is equal to or greater than the size of the minimum block unit, the quantization parameter is obtained by decoding, from the bitstream, quantization parameter information dedicated to the current block, when the size of the current block is less than the size of the minimum block unit, the quantization parameter is obtained by decoding, from the bitstream, quantization parameter information applicable to all blocks in the minimum block unit in which the current block is included.

DETAILED DESCRIPTION

A video encoding apparatus and a video decoding apparatus according to embodiments described below may be a personal computer (PC), a notebook or laptop computer, a personal digital assistant (PDA), a portable multimedia player (PMP), a PlayStation Portable (PSP), or a wireless communication terminal, a smart phone, or the like, and represent a variety of apparatuses equipped with, for example, a communication device such as a modem for performing communications between various devices or wired/wireless communication networks, a memory for storing various programs for encoding or decoding videos and relevant data, and a microprocessor for executing the programs to perform operations and controls.

In addition, the video encoded into a bitstream by the video encoding apparatus may be transmitted in real time or non-real-time to the video decoding apparatus for decoding the same where it is reconstructed and reproduced into the video after being transmitted via a wired/wireless communication network including the Internet, a short range wireless communication network, a wireless LAN network, WiBro (Wireless Broadband) also known as WiMax network, mobile communication network, and landline telephone network or a communication interface such as cable or USB (universal serial bus).

Some embodiments of the present disclosure provide a video encoding and/or decoding apparatus and method that can encode and decode quantization parameters adaptively according to a size of an extended macroblock used and a size of a subblock divided, when encoding and decoding a high-resolution video in units of a block larger than a conventional macroblock. Further, some embodiments of the present disclosure provide a video encoding and/or decoding apparatus and method that can encode and decode quantization parameters adaptively according to a size of an extended macroblock used and a size of a subblock divided, when encoding and decoding a high-resolution video in units of a block larger than a conventional macroblock.

Figure 1:
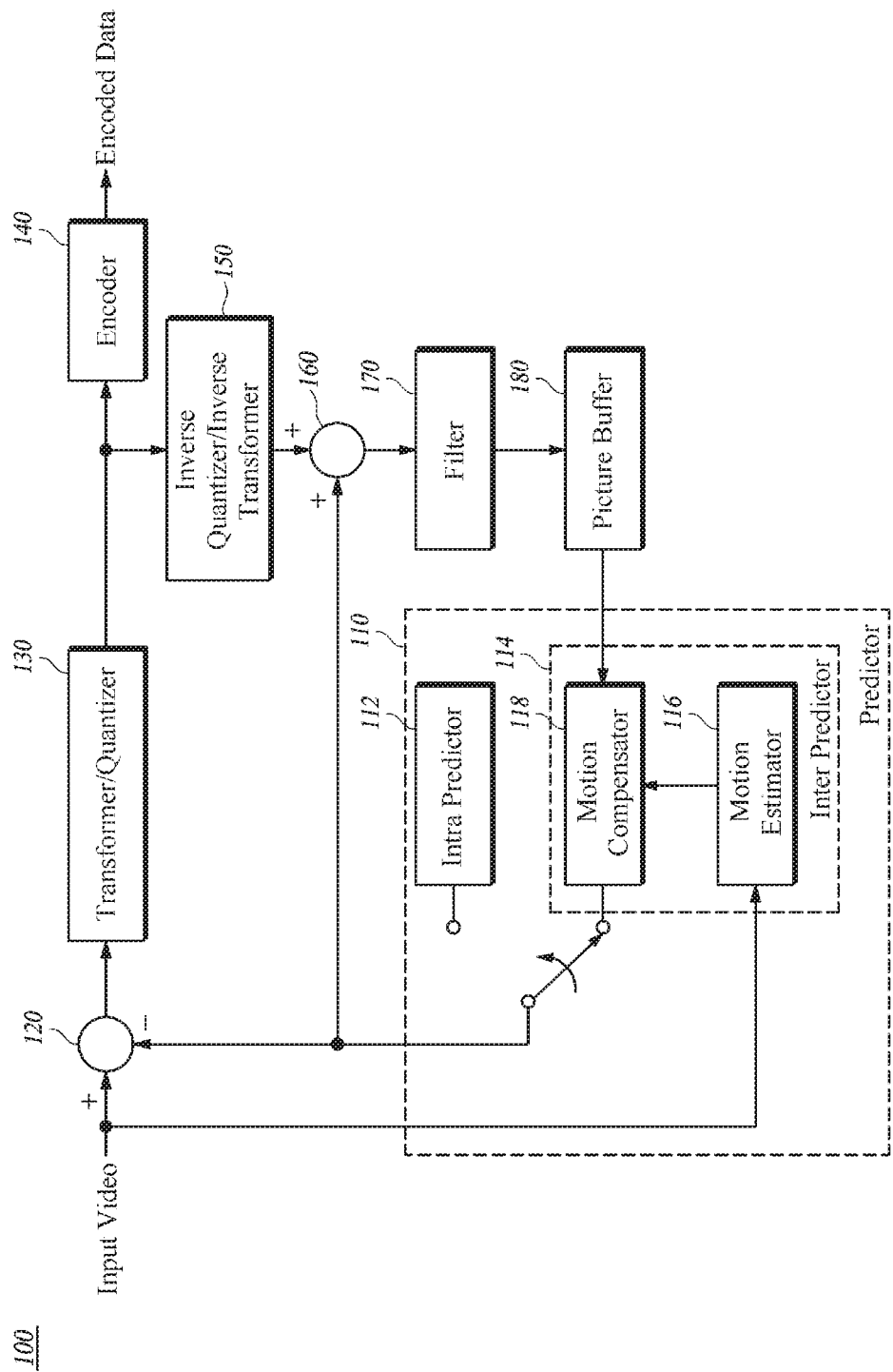
FIG. 1 is a block diagram of a schematic configuration of a video encoding apparatus according to at least one embodiment of the present disclosure.

FIG. 1 is a block diagram of a schematic configuration of a video encoding apparatus according to at least one embodiment of the present disclosure.

A video encoding apparatus 100 according to an embodiment of the present disclosure may include a predictor 110, a subtracter 120, a transformer/quantizer 130, an encoder 140, an inverse quantizer/inverse transformer 150, an adder 160, a filter 170, and a picture buffer 180. Other components of the video encoding apparatus 100, such as the predictor 110, the subtractor 120, the transformer/quantizer 130, the encoder 140, the inverse quantizer/inverse transformer 150, and the adder 160 comprise one or more processors and/or application-specific integrated circuits (ASICs) specified for respectively corresponding operations and functions described herein after. The video encoding apparatus 100 further comprises input units (not shown in FIG. 1) such as one or more buttons, a touch screen, a mic and so on, and output units (not shown in FIG. 1) such as a display, an indicator and so on. The video encoding apparatus 100 further comprises communication modem(s) to receive and/or communication signals to thereby communicate with a video decoding apparatus through wire or wireless networks (herein, the wire or wireless networks include, for example, one or more network interfaces including, but not limited to, cellular, Wi-Fi, LAN, WAN, CDMA, WCDMA, GSM, LTE and EPC networks, and cloud computing networks).

The predictor 110 may include an intra predictor 112 and an inter predictor 114. The inter predictor 114 may include a motion estimator 116 and a motion compensator 118.

An input video may be inputted to the video encoding apparatus 100 in units of a frame or field, or may be inputted to the video encoding apparatus 100 after being divided into macroblocks having N×N pixels (N: an integer greater than or equal to 16). Herein, a macroblock having N×N pixels (N: an integer greater than 16) will be referred to as an extended macroblock (EMB). For example, the extended macroblock may include square pixel blocks of sizes such as 64×64 and 32×32. If an input video is a high-resolution video such as a 4K×2K video, the input video may be encoded after being divided into extended macroblocks having N×N pixels (N: an integer greater than 16), thereby achieving improvement in video compression efficiency. A macroblock described below refers to an N×M pixel block (N and M are greater than or equal to 16 and may be different from each other). If N and M are greater than 16, an N×M macroblock is referred to as an extended macroblock. That is, in the following description, the term "macroblock" and the term "extended macroblock" are interchangeably used and not limited to a 16×16 pixel block.

If the high-resolution input video is of 4:2:0 format, a macroblock includes a luminance block having N×N pixels and a chrominance block having two N/2×N/2 pixels. The improvement of compression efficiency of a high-resolution video by an extended macroblock may be achieved by specific embodiments described below.

Figure 2:
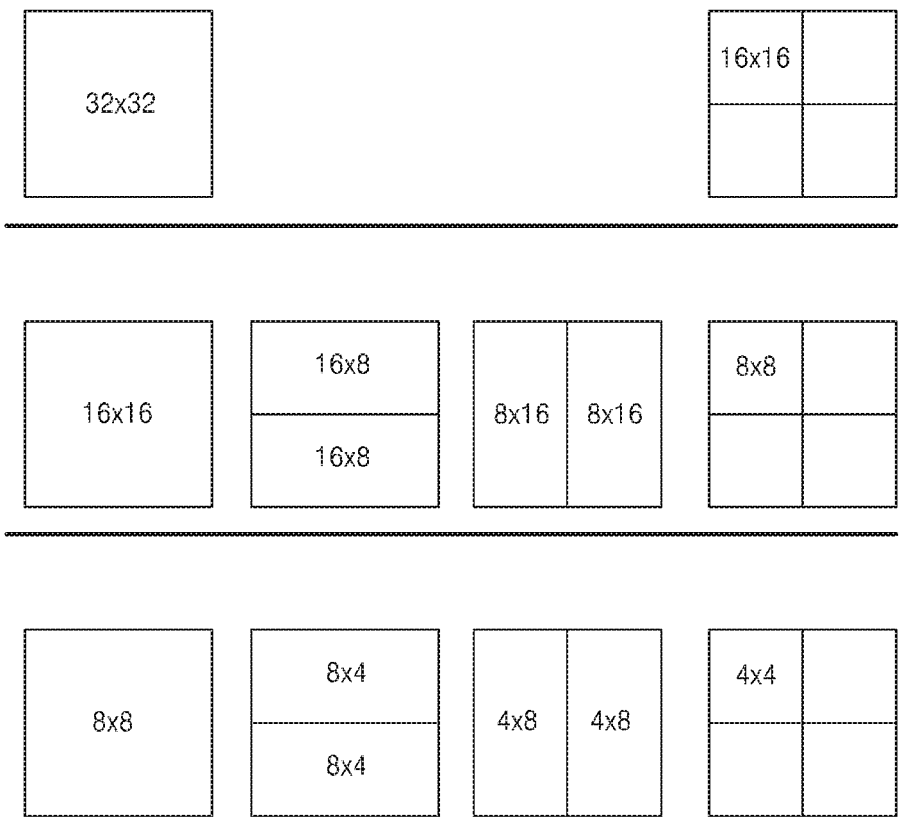
FIG. 2 is a diagram of an example of an extended macroblock used in at least one embodiment of the present disclosure, and an example of a process of dividing an extended macroblock for intra prediction encoding and inter prediction encoding.

FIG. 2 is a diagram of an example of an extended macroblock used in at least one embodiment of the present disclosure, and an exemplary process of dividing an extended macroblock for intra prediction encoding and inter prediction encoding.

A high-resolution input video may be encoded/decoded in units of an extended macroblock, and an extended macroblock may be divided into subblocks prior to intra prediction encoding or inter prediction encoding. For example, as illustrated in FIG. 2, if an extended macroblock is a 32×32 pixel block, the extended macroblock may be divided into 16×16 subblocks prior to encoding and the 16×16 subblock may be divided into smaller subblocks such as 16×8, 8×16, 8×8, 8×4, 4×8, and 4×4 prior to encoding. Although FIG. 2 illustrates the case where an extended macroblock is a 32×32 pixel block, the size of an extended macroblock is not limited thereto and larger pixel blocks may also be used. In addition, although FIG. 2 illustrates that an extended macroblock is divided into square subblocks such as 16×16 pixel blocks prior to encoding, the extended macroblock may also be divided into rectangular subblocks prior to encoding. For example, a 32×32 pixel extended macroblock may be divided into two 16×8 subblocks or two 8×16 subblocks prior to encoding.

The intra predictor 112 of the predictor 110 in the video encoding apparatus 100 of FIG. 1 generates a reference block by using adjacent pixels of a block to be currently encoded (hereinafter referred to as 'current block'), and determines an intra prediction mode by comparing the current block with the reference block. Herein, the adjacent pixels refer to pixels in blocks adjacent to the current block, and encompass adjacent pixels that are included in blocks adjacent to the current block and are adjacent to the current block.

Figure 3:
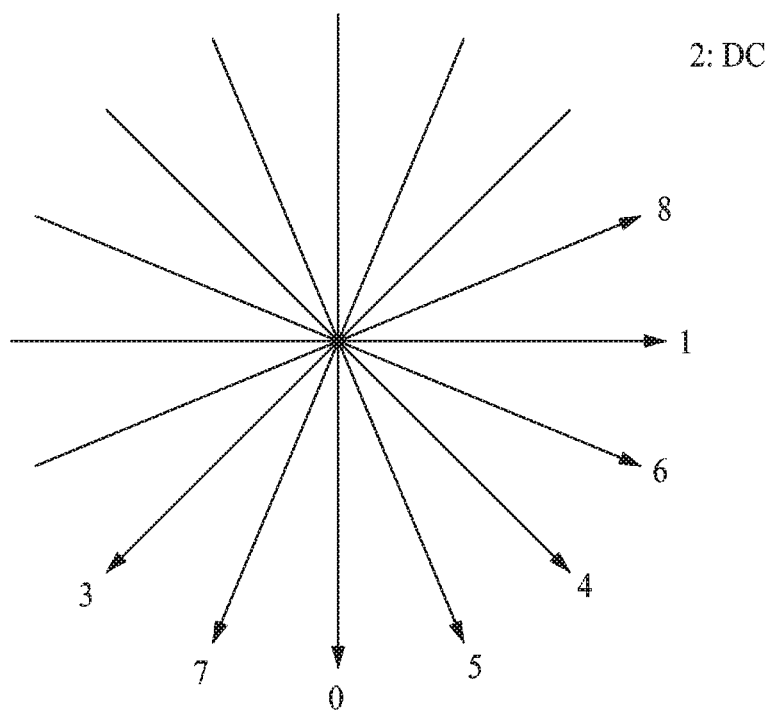
FIG. 3 is a diagram of nine prediction directions and prediction mode numbers in an intra prediction mode of luminance components of 4×4 and 8×8 blocks according to at least one embodiment of the present disclosure.

It is assumed that an extended macroblock is divided into subblocks of 4×4 pixel units with respect to a luminance component to perform an intra prediction. In this case, as illustrated in FIG. 3, the most suitable prediction direction for each 4×4 pixel current block is selected among nine prediction directions according to an intra prediction mode of a luminance component (prediction directions according to prediction modes 0 to 8), and the selected prediction direction is used to intra-prediction-encode the current block. An average value of eight adjacent pixels, which include four adjacent pixels of the left side block of the current block and four adjacent pixels of an upper side block of the current block, is calculated as an average value represented by the prediction mode 2, to predict all of the 4×4 pixels of the current block.

In the case of a block located at a left side boundary of a picture and a block located at an upper side boundary thereof, the left side block and the upper side block are located outside of the picture. In this case, since a block deviating from a picture boundary cannot be referred to, the use of a prediction direction is restricted. For example, prediction directions of the prediction modes 0, 3, 4, 5, 6 and 7 referring to pixels of an upper block cannot be used in the uppermost block of a picture. Exceptionally, in the case of a DC mode, the current block is predicted with reference to only pixels that do not deviate from the picture boundary. If the left side block and the upper side block adjacent to the current block are unavailable, a value of 128 is used as a DC value.

A comparison is made between the selected prediction direction of the current block and the prediction direction of the block having the smaller prediction mode number among the left side block and the upper side block of the current block. If the two prediction directions are identical, a prediction mode flag (which may be represented by, for example, 1 bit), which indicates whether the prediction direction of the current block estimated from the adjacent blocks and the selected prediction direction of the current block are identical, is encoded to indicate that the selected prediction direction is identical to the estimated prediction direction.

If the prediction direction of the current block estimated from the adjacent blocks is different from the selected prediction direction of the current block, the prediction mode flag is encoded to indicate that difference. Prediction mode information (which may be represented by, for example, 3 bits), which is to indicate which of the remaining eight prediction modes of nine prediction modes except the prediction mode corresponding to the estimated prediction direction of the current block is the selected prediction direction of the current block, is encoded.

It is assumed that the extended macroblock is divided into subblocks of 8×8 pixels with respect to a luminance component to perform an intra prediction. In this case, like the intra prediction in units of a 4×4 pixel, an intra prediction in units of an 8×8 pixel with respect to a luminance component uses nine prediction directions as illustrated in FIG. 3. Except for a difference in the block size (4×4 pixels and 8×8 pixels), a method of calculating predicted pixels is the same as in the case of the intra prediction encoding in units of a 4×4 pixel.

It is assumed that the extended macroblock is divided into subblocks of 16×16 pixels with respect to a luminance component to perform an intra prediction. In this case, among four prediction directions illustrated in FIG. 4, a prediction direction providing the highest encoding efficiency is selected. According to the selected prediction direction, a 16×16 pixel block is prediction-encoded from 32 adjacent pixels including 16 adjacent pixels in an upper side 16×16 pixel block of a 16×16 pixel current block and 16 adjacent pixels in a left side 16×16 pixel block of the 16×16 pixel current block.

Figure 4:
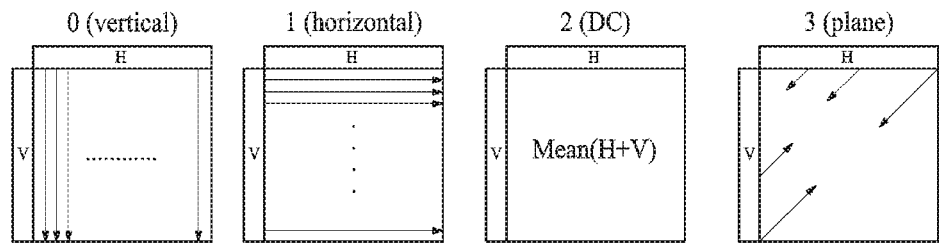
FIG. 4 is an illustration diagram of four prediction directions and prediction mode numbers in an intra prediction mode of a luminance component of a 16×16 block according to at least one embodiment of the present disclosure.

Referring to FIG. 4, in the case of a plane prediction corresponding to the prediction mode 3, adjacent pixels in an upper side block of the current block and adjacent pixels in a left side block of the current block are interpolated in a diagonal direction prior to the prediction. In the case of an average value prediction corresponding to the prediction mode 2, an average value of 16 adjacent pixels in the upper side block of the current block and 16 adjacent pixels in the left side block of the current block is predicted by all of the 16×16 pixels of the current block. Herein, if the current block is located at an uppermost position in the picture, an average value of 16 adjacent pixels in the left side block of the current block is used as a prediction value. If the current block is located at a leftmost position in the picture, an average value of 16 adjacent pixels in the upper side block of the current block is used as a prediction value. If the left side block and the upper side block of the current block are unavailable, a value of 128 is used as a prediction value. A prediction mode of the 16×16 pixel block is not prediction-encoded, and a number of a selected prediction mode is encoded as prediction mode information (which may be represented by, for example, 2 bits).

Figure 5:
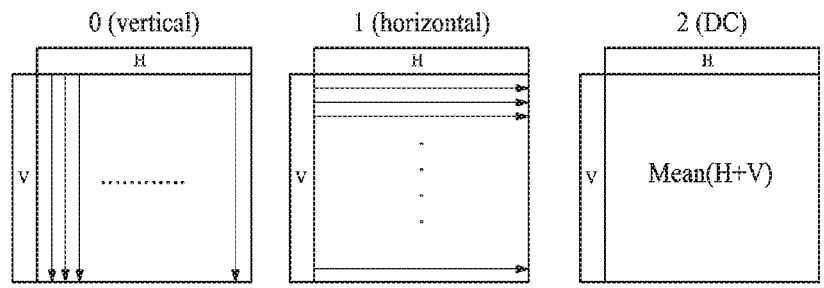
FIG. 5 is a diagram of three prediction directions and prediction mode numbers in an intra prediction mode of luminance components of blocks except 4×4, 8×8 and 16×16 blocks according to at least one embodiment of the present disclosure.

If the extended macroblock is divided into subblocks, except the above-described 4×4 pixel block, 8×8 pixel block or 16×16 pixel block, to perform an intra prediction, an intra prediction mode of a luminance component may be represented by three prediction directions and prediction mode numbers as illustrated in FIG. 5. If the extended macroblock is divided into the remaining subblocks, except the 4×4 pixel block, 8×8 pixel block or 16×16 pixel block, to perform intra prediction, and if the size of a relevant subblock is m x n (n and m are integers smaller than N, and N is an integer greater than or equal to 16), an m×n pixel block is intra-prediction-encoded from m adjacent pixels in the upper side block of the current block and n adjacent pixels in the left side block of the current block, according to the prediction direction proving the highest encoding efficiency, which is selected among three prediction directions illustrated in FIG. 5.

In the case of an average value prediction corresponding to the prediction mode 2, an average value of m adjacent pixels in the upper side block of the current block and n adjacent pixels in the left side block of the current block is used to prediction-encode the current block. Herein, if the current block is located at an uppermost position in the picture, an average value of n adjacent pixels in the left side block of the current block is used as a prediction value of the current block. If the current block is located at the leftmost position in the picture, an average value of m adjacent pixels in the upper side block of the current block is used as a prediction value of the current block. If the left side block and the upper side block of the current block are unavailable, a value of 128 is used as a prediction value of the current block.

If the selected prediction direction of the current block is identical to the prediction direction of the block having the smaller prediction mode number from the left side block and the upper side block of the current block, a prediction mode flag (which may be represented by, for example, 1 bit), which indicates whether the prediction direction of the current block estimated from the adjacent blocks of the current block and the selected prediction direction of the current block are identical, is encoded as information indicating the selected prediction direction of the current block is identical to the estimated prediction direction of the current block. Since available prediction mode numbers of the m×n pixel block are 0 to 2, if the prediction mode number of the current block estimated by using the left side block and the upper side block of the current block is greater than or equal to 3, the prediction direction of the current block may use a prediction mode number 2 (DC mode). For example, if the prediction mode number of the current block estimated from the adjacent blocks is 4, the prediction mode number of the current block is set to 2 to encode the prediction mode flag (which may be represented by, for example, 1 bit), which indicates whether the estimated prediction direction of the current block and the selected prediction direction of the current block are identical.

Herein, the intra prediction of the extended macroblock may be performed in units of a 16×16 or less pixel block, that is, in units of a 4×4 pixel block, an 8×8 pixel block, a 16×16 pixel blocks, or an m×n pixel block (herein, m≠n, and m and n are numbers smaller than 16).

Figure 6:
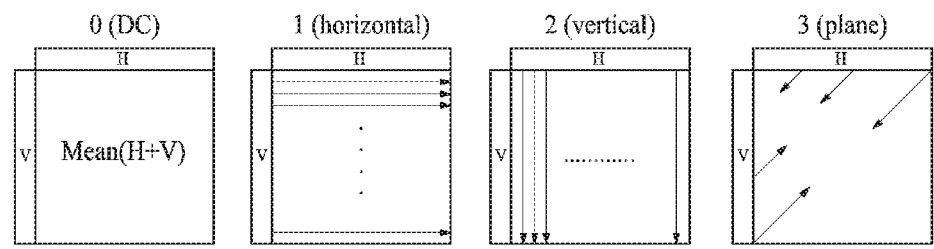
FIG. 6 is a diagram of four prediction directions and prediction mode numbers in an intra prediction mode of chrominance components of N/2×N/2 blocks according to at least one embodiment of the present disclosure.

An intra prediction of a chroma component may be performed in units of an N/2×N/2 pixel block. As illustrated in FIG. 6, four prediction directions such as an average value prediction, a horizontal prediction, a vertical prediction, and a plane prediction may be used. The intra prediction of the chrominance component may be performed in units of an 8×8 pixel block.

FIG. 6 illustrates prediction directions and prediction mode numbers corresponding to four intra prediction modes of a chrominance component according to at least one embodiment of the present disclosure. Referring to FIG. 6, except for a difference in the block size (16×16 pixels and 8×8 pixels), a prediction value calculation method for a plane prediction corresponding to the prediction mode 3 and a average value prediction corresponding to the prediction mode 0 is the same as in the case of the intra prediction encoding method of a luminance component in units of a 16×16 pixel. A prediction mode of a chrominance signal may be selected independently from a prediction mode of a luminance signal. There are two types of chrominance signals, that is, U and V, but the prediction method is the same. A prediction mode of a chrominance signal is one for each of U and V. A prediction mode of each chrominance signal is not prediction-encoded, and a selected prediction mode number is simply represented by 2 bits.

According to the intra prediction mode determined as described above, the intra predictor 112 generates a predicted block by predicting the current block. The subtracter 120 generates a residual block by subtracting the predicted block from the current block. The transformer/quantizer 130 generates a quantized transform coefficient by transforming and quantizing the residual block. The encoder 140 generates encoded data by entropy-encoding the quantized transform coefficient.

The transformer/quantizer 130 may perform a 4×4 transform on a residual block of the current block for which an intra prediction in units of a 4×4, 4×8 or 8×4 pixel is selected, and perform an 8×8 transform on a residual block of the current block for which an intra prediction in units of an 8×8, 8×16 or 16×8 pixel is selected. In addition, the transformer/quantizer 130 may perform a 16×16 transform on a residual block of the current block for which an intra prediction in units of a 16×16 or more pixel is selected. In this case, since the unit of an intra prediction and the size of a subblock are the same, a transform type may be determined according to the block size of a subblock.

Herein, a residual block having 16×16 pixels (hereinafter referred to as '16×16 pixel residual block'), on which a 16×16 transform is performed, is subdivided into sixteen residual blocks having 4×4 pixels (hereinafter referred to as '4×4 pixel residual blocks'), and a 4×4 transform may be performed on the 4×4 pixel residual blocks. Thereafter, a transform block having a 4×4 transform coefficient (hereinafter referred to as 'DC component block') is constituted by only sixteen DC components of each transform block having 4×4 pixels (hereinafter referred to as '4×4 pixel transform block'), which is generated by 4×4-transforming each 4×4 pixel residual block, and a 4×4 transform is again performed on the DC component block. Herein, a transform type used to transform the DC component block may be different from a transform type used to transform the residual block. That is, a 4×4 discrete cosine transform (DCT) may be performed on the 4×4 pixel residual block, and a 4×4 Hadamard transform may be performed on the DC component block. For example, a 16×32 pixel residual block of the current block, for which an intra prediction in units of a 16×32 pixel is selected, is divided into two 16×16 pixel residual blocks, and each of the 16×16 pixel residual blocks is 4×4-transformed in units of a 4×4 pixel. Thereafter, a DC component block is constituted by the DC components of each 4×4 transform block in the 16×16 pixel residual block, and a 4×4 transform is again performed on the DC component block.

In the case of a chrominance signal, as with the intra prediction in units of a 16×16 or more pixel, a 4×4 transform is performed and then a 4×4 transform is again performed on a DC component block. However, a residual block of a macroblock of a chrominance component is divided into residual blocks having 8×8 pixels (hereinafter referred to as '8×8 pixel residual blocks'), and a 4×4 transform is performed on four 4×4 pixel residual blocks in each 8×8 pixel residual block. A DC component block having a 2×2 transform coefficient is constituted by the DC components of four 4×4 pixel residual blocks in the 8×8 pixel residual block, and a 2×2 transform may be performed on the DC component block. In this case, likewise, a 4×4 transform type on the 8×8 pixel residual block and a 2×2 transform type on the DC component block may be different.

Instead of determining an optimal block type with respect to an extended block and then performing a transform according to the above-described transform type, a high-efficiency transform type may be selected and used according to the size of a subblock used in an intra prediction in units of a 16×16 pixel block. That is, the transformer/quantizer 130 may perform one or more transforms and quantizations in units of a 16×16 pixel block, select a highest-efficiency transform type, and generate a transformed/quantized transform coefficient according to the selected transform type. In this case, the encoder 140 may generate transform type data by generating and encoding a transform type for identifying the type of a transform selected for each block. The transform type data are included in the encoded data. However, different transforms cannot be used in the 16×16 pixel block.

More specifically, if the 16×16 pixel block is divided into 8×8 pixel blocks and if one or more of four 8×8 pixel blocks are divided into subblocks smaller than the 8×8 pixel block, only a 4×4 transform may be performed on the 16×16 pixel block. In this case, a transform type is not encoded. In addition, if the 16×16 pixel block is divided into four 8×8 pixel blocks, a 4×4 transform and an 8×8 transform may be performed on the 16×16 pixel block to select a transform type requiring a low encoding cost, and a transform type indicating the type of a selected transform (which may be represented by, for example, 1 bit) may be encoded. In addition, if the 16×16 pixel block is divided into two 8×16 pixel subblocks, a 4×4 transform, an 8×8 transform, and an 8×16 transform may be performed on the residual blocks of the 16×16 pixel subblock to select a transform type requiring the lowest encoding cost, and if the 16×16 pixel block is divided into two 16×8 pixel subblocks, a 4×4 transform, an 8×8 transform, and a 16×8 transform may be performed on the residual blocks of the 16×16 pixel subblock to select a transform type requiring the lowest encoding cost, and a transform type indicating the type of a selected transform (which may be represented by, for example, 1 bit or 2 bits) may be encoded. A 4×4 transform, an 8×8 transform, and a 16×16 transform may be performed on 16×16 or more pixel subblocks to select a transform type requiring the lowest encoding cost, and a transform type indicating the type of a selected transform (which may be represented by, for example, 1 bit or 2 bits) may be encoded.

Referring back to FIG. 1, the motion estimator 116 of the inter predictor 114 of the predictor 110 detects a block most similar to a current block being a current encoding target in a current picture, that is, a reference block from a reference picture, and outputs a motion vector (MV) representing the relative position of the reference block with respect to the current block. This process is called a motion estimation. The motion estimation generates a motion vector by comparing subblocks in the macroblock with one or more reference pictures in the picture buffer 180. 8×8 pixel blocks may use different reference pictures, but subblocks in an 8×8 pixel block use the same reference picture.

The motion vector is encoded by the encoder 140 and is included in encoded data. The encoder 140 uses a mean value of motion vectors of adjacent blocks of the current block as a predicted motion vector (PMV). The encoder 140 generates motion information data by encoding only a differential motion vector (DMV) that is a difference vector between the predicted motion vector and the motion vector of the current block. Herein, the encoder 140 may also encode a reference picture index in addition to the differential motion vector. That is, the motion information may include the differential motion vector and the reference picture index. The encoder 140 may generate motion information data by encoding the motion information, and include the motion information data in the encoded data.

In one of embodiments of the present disclosure, a SKIP mode is used with respect to an extended macroblock that is a 16×16 or more pixel block. The skip mode is a mode that does not encode specific information such as block type information, motion information, or transform coefficient information. If a block to be currently encoded is a SKIP mode, only information indicating that a current block is the SKIP mode may be encoded, and other information such as a block type, motion information, and a transform coefficient may not be encoded. Alternatively, only motion information of a current block may be encoded, and information such as type information and a transform coefficient may not be encoded. Or else, only a transform type and a transform coefficient of a current block may be encoded, and type information and motion information may not be encoded.

If an extended macroblock being a 16×16 or more pixel block is a SKIP macroblock, the predicted motion vector is used to perform a motion estimation and compensation. However, if one or more of the motion vectors used to determine the predicted motion vector are 0, the predicted motion vector is determined as 0. For example, if the motion vectors of the adjacent blocks A, B and C are respectively mvA (0, 10), mvB (1, 10) and mvC (2, 10), the predicted motion vector of the current block is (0, 10).

The subtracter 120 generates a residual block by subtracting the reference block, which is indicated by the estimated motion vector of the current vector, from the current block. The transformer/quantizer 130 transforms and quantizes the residual block generated by the subtracter 120. The encoder 140 generates encoded data by entropy-encoding a quantized transform coefficient. Herein, the transformer/quantizer 130 performs one or more transforms and quantizations according to the size of a current block, selects a highest-efficiency transform type, and generates a quantized transform coefficient according to the selected transform type. The encoder 140 generates transform type data by generating and encoding a transform type for identifying the type of a transform selected for each block. The transform type data are included in the encoded data. However, different transforms cannot be used in the 16×16 pixel block.

As in the transform method described in the intra prediction block, if the 16×16 pixel subblock is divided into 8×8 pixel subblocks and if one or more of four 8×8 pixel subblocks are divided into subblocks smaller than the 8×8 pixel block, only a 4×4 transform may be performed on the residual blocks of the 16×16 pixel subblock. In this case, a transform type is not encoded. If the 16×16 pixel subblock is divided into four 8×8 pixel subblocks, a 4×4 transform and an 8×8 transform are performed on the residual blocks of the 16×16 pixel subblock to select a transform type requiring a low encoding cost, and a transform type indicating the type of a selected transform (which may be represented by, for example, 1 bit) is encoded.

If the 16×16 pixel subblock is divided into two 8×16 pixel subblocks, a 4×4 transform, an 8×8 transform, and an 8×16 transform are performed on the residual blocks of the 16×16 pixel subblock to select a transform type requiring the lowest encoding cost, and if the 16×16 pixel subblock is divided into two 16×8 pixel subblocks, a 4×4 transform, an 8×8 transform, and a 16×8 transform are performed on the residual blocks of the 16×16 pixel subblock to select a transform type requiring the lowest encoding cost, and a transform type indicating the type of a selected transform (which may be represented by, for example, 1 bit or 2 bits) is encoded. A 4×4 transform, an 8×8 transform, and a 16×16 transform are performed on 16×16 or more pixel subblocks to select a transform type requiring the lowest encoding cost, and a transform type indicating the type of a selected transform (which may be represented by, for example, 1 bit or 2 bits) is encoded.

The residual blocks transformed/quantized by the transformer/quantizer 130 are inverse-transformed/inverse-quantized by the inverse transformer/inverse quantizer 150 to reconstruct the residual blocks. The adder 160 reconstructs the current block by adding the reconstructed residual blocks and the predicted blocks predicted by the predictor 110. The encoder 140 generates encoded data by entropy-encoding a transform coefficient quantized by the transformer/quantizer 130.

A process of dividing an orthogonally-transformed component by a quantization step and approximating the result to a representative integer value is called quantization, and the representative integer value is called a quantization value. Conversely, a process of multiplying a quantization value by a quantization step to restore an orthogonally-transformed component is called inverse quantization.

When a quantization process is applied, efficiency can be increased because an orthogonally-transformed component can be represented in a smaller integer value and encoding can be performed with a smaller number of bits as compared to the case of encoding an unquantized component. In addition, a compression rate can be adjusted by changing the size of a quantization step.

In addition to reducing the amount of information, quantization should be performed to draw up the best picture quality within a predetermined range in consideration of a bandwidth provided by other physical media or a data transmission channel. The reason for this is that a picture quality obtainable through the same channel bandwidth may vary according to quantization parameter values applied.

If an extended macroblock is a 32×32 pixel block, whether to perform an encoding in units of a 32×32 pixel block or in units of a 16×16 pixel block may be indicated by an extended macroblock flag (extended_mb_flag). For example, if the extended macroblock flag is 1, it may indicate that an encoding is performed in units of a 32×32 pixel block; and if the extended macroblock flag is 0, it may indicate that an encoding is performed in units of a 16×16 pixel block. In addition, if the extended macroblock flag is 0, an intra prediction encoding or an inter prediction encoding may be performed on each of the divided 16×16 pixel blocks in an extended macroblock. In addition, each 16×16 pixel block may be divided into smaller subblocks prior to encoding.

If an extended macroblock is an inter mode, the extended macroblock may be divided in units of a 16×16 pixel block prior to intra prediction encoding or inter prediction encoding. That is, if an extended macroblock is inter-prediction-encoded, the respective 16×16 pixel blocks in the extended macroblock may coexist in both intra prediction encoding mode and inter prediction encoding mode. In addition, if an extended macroblock is intra-prediction-encoded, all of the respective 16×16 pixel blocks in the extended macroblock may be encoded in an intra prediction encoding mode.

An embodiment of the present disclosure proposes a method of encoding quantization parameters adaptively from a basic encoding block unit applied in encoding to a minimum block unit of a predetermined size.

Figure 7:
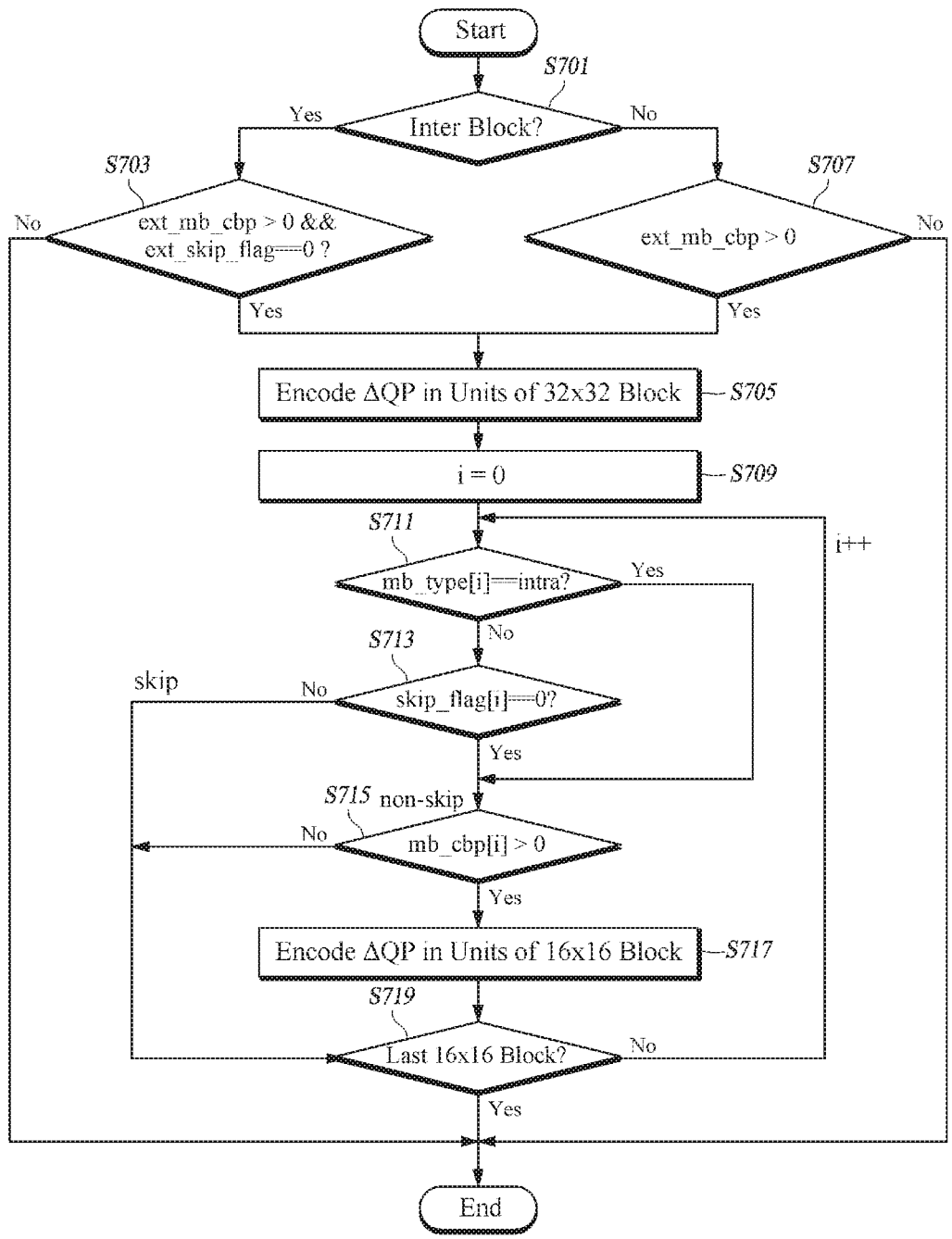
FIG. 7 is a flow diagram of a method of encoding quantization parameters by an encoder according to at least one embodiment of the present disclosure.
Figure 8:
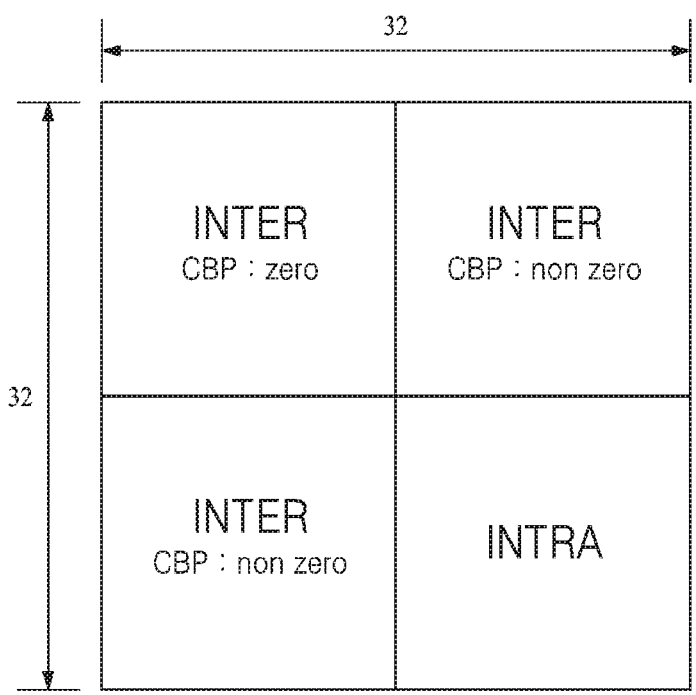
FIG. 8 is a diagram of an example of a CBP and an encoding mode of a 32×32 pixel block.

FIG. 7 is a flow diagram of a method of encoding quantization parameters by the transformer/quantizer 130 according to at least one embodiment of the present disclosure. Herein, it is assumed that the size of an extended macroblock is a 32×32 block, the minimum block unit for transmission of a quantization parameter is a 16×16 block, and a coded block pattern (CPB) and an encoding mode of a relevant block are determined as illustrated in FIG. 8. Herein, the CBP is information indicating whether a relevant block includes a non-zero quantized transform coefficient, and it may be encoded in units of a predetermined sized block such as a 32×32 or 16×16 pixel block.

An encoding of a quantization parameter for an extended macroblock of an inter prediction encoding mode illustrated in FIG. 8 may be determined based on a SKIP mode and/or CBP information of a block to be encoded. The skip mode is a mode that does not encode specific information such as block type information, motion information, or transform coefficient information. The CBP may be encoded in units of a 16×16 pixel block. In this case, 1 bit may be used per 8×8 pixel block to indicate whether a non-zero transform coefficient is present per 8×8 pixel block in a 16×16 pixel block. With respect to a chrominance component, 1 bit may be used to indicate whether a non-zero transform coefficient is present in two 2×2 chrominance component DC blocks, and 1 bit may be used to indicate whether a non-zero transform coefficient is present in two 8×8 chrominance component AC blocks.

If an extended macroblock is divided into blocks larger than 16×16 pixels prior to encoding, for example, if an extended macroblock is a 64×64 pixel block and is divided into four 32×32 pixel blocks prior to encoding, a CBPX flag may be used to indicate whether a non-zero coefficient to be encoded is present in a subblock for a block to be encoded. Herein, X is an integer representing the size of an encoding target. A 64×64 pixel block may be represented by a CBP64 flag, and a 32×32 pixel block may be represented by a CBP32 flag. In addition, the CBPX flag may be represented by 1 bit such as 0 or 1. For example, if a non-zero transform coefficient is present in the 32×32 pixel block, the CBP32 flag may be represented by 1 prior to encoding.

If the size of a subblock is not one of 32×32, 32×16 and 16×32, the CBP may be encoded. Herein, if the size of a subblock is not one of 32×32, 32×16 and 16×32 pixels, whether the size of a subblock is a 16×16, 16×8 or 8×16 pixels may be determined. If the subblock is a 16×16, 16×8 or 8×16 pixel block, and if a non-zero encoding coefficient is present in the relevant subblock, the CBP16 flag (which may be represented by, for example, 1 bit such as '1') may be encoded. If not, the CBP may be encoded in units of a 16×16 pixel block without using the CBP flag.

If the CBP flag is encoded, and if the CBP flag is not 0, a transform type may be encoded. Exceptionally, if a 16×16 pixel block is divided into four 8×8 pixel blocks, and if an encoded CBP is not 0, a transform type applied in units of a 16×16 pixel block may be encoded.

After the transform type is encoded, the CBP is encoded according to the transform type. If a 16×16 transform is used, only two CBP bits of a chrominance component are encoded; and if an 8×16 transform or a 16×8 transform is used, two CBP bits indicating whether two 8×16 or 16×8 pixel blocks in the 16×16 pixel block have a non-zero transform coefficient are encoded. However, exceptionally, if a CBP bit of the first partition block among two partition blocks is 0, a CBP bit of the second partition block may not be encoded.

If a 32×32 pixel extended macroblock is an inter block (S701), an inter block and an intra block may coexist in the extended macroblock as illustrated in FIG. 8. If a CBP of an extended macroblock of an inter prediction encoding mode is not 0 and a 32×32 pixel block is not a SKIP mode (S703), the encoder 140 encodes a quantization parameter in units of a 32×32 pixel block (S705). If an extended macroblock is an intra block and a CBP of an extended macroblock of an intra prediction encoding mode is not 0 (S707), the encoder 140 encodes a quantization parameter in units of a 32×32 pixel block (S705). Herein, as expressed in Equation 4, the encoder 140 encodes a differential value of a previously-encoded 32×32 block from a quantization parameter value.

$$\Delta QP_{32} = QP_{cur}^{32} - QP_{prev}^{32} \qquad \text{Equation 4}$$

In FIG. 7, an ext_mb_cbp denotes a CBP in units of a 32×32 pixel block that is an extended macroblock. An ext_skip_flag is a flag indicating whether a 32×32 pixel block that is an extended macroblock is a SKIP mode. If the 32×32 pixel block is not a SKIP mode, it may be represented by 0.

After encoding a $\Delta QP_{32}$ value calculated by Equation 4, the encoder 140 allocates 0 to the sequence of a block to be currently encoded, that is, the first 16×16 subblock in an 32×32 pixel block, and starts a quantization parameter encoding process with respect to the divided 16×16 subblocks in the 32×32 pixel block (S709). In FIG. 7, an encoding type of the ith 16×16 subblock in a 32×32 pixel extended macroblock is denoted by mb_type[i]. However, the size of a subblock is not limited to a 16×16 pixel block. For example, if an extended macroblock is a 64×64 pixel block, a subblock in the extended macroblock may be a 32×32 pixel block.

If an encoding mode of the ith subblock in an extended macroblock is an inter prediction mode (S711), the encoder 140 determines whether the ith 16×16 pixel block in the 32×32 pixel block is a SKIP mode (S713), and determines whether a non-zero quantized transform coefficient is present in the ith 16×16 pixel block that is not a SKIP mode (S715).

A skip_flag[i] is a syntax indicating whether the ith 16×16 pixel block in the 32×32 pixel block is a SKIP mode, and an mb_cbp[i] denotes a CBP of the ith 16×16 pixel block unit in the 32×32 pixel block.

If the ith 16×16 pixel block in the 32×32 pixel block is not a SKIP mode and a quantized transform coefficient is not included (in steps S713 and step S715), that is, if the CBP is greater than 0, the encoder 140 encodes a quantization parameter in units of the ith 16×16 pixel block (S717). That is, the 16×16 block to be encoded is a SKIP mode or if the CBP value is 0, a quantization parameter of the relevant block is not encoded. If the relevant block is not a SKIP mode and the CBP value is not 0, a quantization parameter of the 16×16 block is subtracted from a quantization parameter of the 32×32 block prior to encoding, as expressed in Equation 5. In this case, if a subblock in the extended macroblock is an intra block, and if a CBP value of the ith 16×16 subblock is not 0, a quantization parameter of the relevant subblock is subtracted from a quantization parameter of the 32×32 block prior to encoding.

$$\Delta QP_{16}^{i} = QP_{16}^{i} - QP_{cur}^{32} \qquad \text{Equation 5}$$

In Equation 5, $\Delta QP_{16}^{i}$ is a differential quantization parameter value of the ith 16×16 block in the current 32×32 block, and $QP_{16}^{i}$ denotes a quantization parameter value of the ith 16×16 block in the current 32×32 block.

In this manner, quantization parameters of the respective 16×16 pixel blocks in the 32×32 pixel block are sequentially encoded. After a quantization parameter of the last 16×16 pixel block in the 32×32 pixel block is encoded, an encoding of the quantization parameters of the extended macroblock is ended (S719).

Although it is assumed in FIG. 7 that an extended macroblock is a 32×32 pixel block, the size of an extended macroblock is not limited to a 32×32 pixel block. For example, an extended macroblock may be a 64×64 pixel block, a 128=128 pixel block, or a larger pixel block. With respect to such an extended macroblock, an encoding of a quantization parameter may be performed by subtracting a quantization parameter of a subblock from a quantization parameter of an extended macroblock. For example, if an extended macroblock is a 64×64 pixel block, and if a CBP of the extended macroblock is not 0 and the 64×64 pixel block is not a SKIP mode, the encoder 140 encodes a quantization parameter in units of a 64×64 pixel block. Herein, with respect to the extended macroblock, a differential value from a quantization parameter value of a previously encoded 64×64 block may be encoded as expressed in Equation 6. In this example, a description has been made of the case where a quantization parameter of an extended macroblock is encoded. However, a quantization parameter of a current subblock may be predicted by using a quantization parameter of a previously encoded upper or left side subblock or a quantization parameter of a subblock that is previous in the encoding sequence with respect to a subblock of the extended macroblock.

$$\Delta QP_{64} = QP_{cur}^{64} - QP_{prev}^{64} \qquad \text{Equation 6}$$

After encoding a $\Gamma QP_{64}$ value calculated by Equation 6, the encoder 140 starts a quantization parameter encoding process with respect to the divided 32×32 subblocks in the 64×64 pixel block. Herein, a sequence 0 is allocated to the first 32×32 subblock. In this case, if an encoding is performed in a sequence header or a slice header or if a predetermined minimum quantization encoding block size is 64×64, no more quantization parameters are encoded.

The encoder 140 determines whether the ith 32×32 pixel block of the 64×64 pixel block is a SKIP mode, and determines whether a non-zero quantized transform coefficient is present in the ith 32×32 pixel block that is not a SKIP mode. If the ith 32×32 pixel block in the 64×64 pixel block is not a SKIP mode and a quantized transform coefficient is not included, that is, if the CBP is greater than 0, the encoder 140 encodes a quantization parameter in units of the ith 32×32 pixel block. That is, the 32×32 block to be encoded is a SKIP mode or if the CBP value is 0, a quantization parameter of the relevant block is not encoded. If the relevant block is not a SKIP mode and the CBP value is not 0, a quantization parameter of the 32×32 block is subtracted from a quantization parameter of the 64×64 block prior to encoding, as expressed in Equation 7. Herein, the technology of predicting a current quantization parameter by using a quantization parameter of an upper block is merely an example. A quantization parameter of a current block may be encoded by differentiating a quantization parameter of a previously encoded left or upper side block or a quantization parameter of a block that precedes in the encoding sequence.

$$\Delta QP_{32}{}^i = Q_{32}{}^i - QP_{cur}{}^{64} \qquad \text{Equation 7}$$

In Equation 7, $\Delta QP_{32}{}^i$ is a differential quantization parameter value of the ith 32×32 block in the current 64×64 block, and $QP_{32}{}^i$ denotes a quantization parameter value of the ith 32×32 block in the current 64×64 block. Herein, a quantization parameter encoding process with respect to subblocks smaller than the ith 32×32 pixel block is the same as described with reference to FIG. 7.

In this manner, quantization parameters of the respective 32×32 pixel blocks in the 64×64 pixel block are sequentially encoded. If a specific 32×32 subblock is encoded into smaller subblocks, the method of FIG. 7 is applied to the 32×32 block to encode a quantization parameter. The process of FIG. 7 is applied recursively when a specific subblock is divided into smaller subblocks prior to encoding. After a quantization parameter of the last 32×32 pixel block in the 64×64 pixel block is encoded, an encoding of the quantization parameters of the relevant extended macroblock is ended.

Herein, although the encoding of quantization parameters has been described as encoding a differential value between a quantization parameter value of an extended macroblock to be encoded and a quantization parameter value of a primarily-divided block, that is, a differential value between a quantization parameter value of an extended macroblock and a quantization parameter value of a primarily-divided 32×32 pixel block if a size of the extended macroblock is a 64×64 pixel block, the encoding of a differential value of the quantization parameters is not limited thereto. For example, a differential value between a quantization parameter value of the 64×64 pixel block and a quantization parameter value of the 16×16 pixel block in the 32×32 pixel block may be encoded. In addition, quantization parameter prediction using adjacent subblocks may be used.

In this way, the embodiment of the present disclosure can be applied to macroblocks of various sizes. For example, if the size of an extended macroblock is a 64×64 block, and if a 64×64 pixel block is not a SKIP mode and a CBP is not 0 as described above, after a quantization parameter of the 64×64 pixel block is encoded, quantization parameters of the respective 32×32 pixel blocks in the 64×64 pixel block may be encoded in the same way as described above. In this case, an encoding of quantization parameters based on CBP information may be performed in units of a 16×16 pixel block. However, the minimum block unit for encoding the quantization parameters is not limited to a 16×16 block, but may be an 8×9 pixel block or a 4×4 pixel block in some cases. The minimum block unit for encoding the quantization parameters may be encoded in a sequence header or a slice header, and a size arranged between the encoder and the decoder may be used. In addition, although FIG. 7 illustrates that a 32×32 pixel block is divided into four 16×16 pixel blocks to encode a quantization parameter, the number of blocks divided is not limited thereto. For example, a 32×32 pixel block may be divided into two 32×16 pixel blocks or two 16×32 pixel blocks to encode a quantization parameter, and each 16×16 pixel block in the 32×32 pixel block may be divided into smaller pixel blocks such as a 16×8 pixel block, an 8×16 pixel block, and 8×8 pixel block to encode a quantization parameter.

In addition, although FIG. 7 illustrates that a 32×32 pixel block is divided into four 16×16 pixel blocks to encode a quantization parameter, a quantization parameter of a pixel block with a predetermined size N×M (N may be equal to or different from M) corresponding to an encoding layer or a pixel block to be encoded may be encoded according to a division level of the extended macroblock.

In addition, although FIG. 7 illustrates that whether to encode a quantization parameter is determined based on CBP information and information as to whether a block to be encoded is a SKIP mode, whether to encode a quantization parameter may also be determined by other syntaxes or parameters, as well as based on the SKIP mode information and the CBP information.

In addition, although FIG. 7 illustrates that a quantization parameter of the uppermost block is encoded by differentiation from a quantization parameter of a previous block, an encoding of a quantization parameter is not limited thereto. For example, the quantization parameter may be encoded through any other operations including differentiation, and the quantization parameter of the uppermost block may be encoded in units of a slice or through any other operations including differentiation and a quantization parameter value.

The filter 170 filters a picture, which is generated by accumulating the current blocks reconstructed by the adder 160, by using a deblocking filter. The filtered picture is stored in the picture buffer 180 and is used as a reference picture for a next picture.

Figure 9:
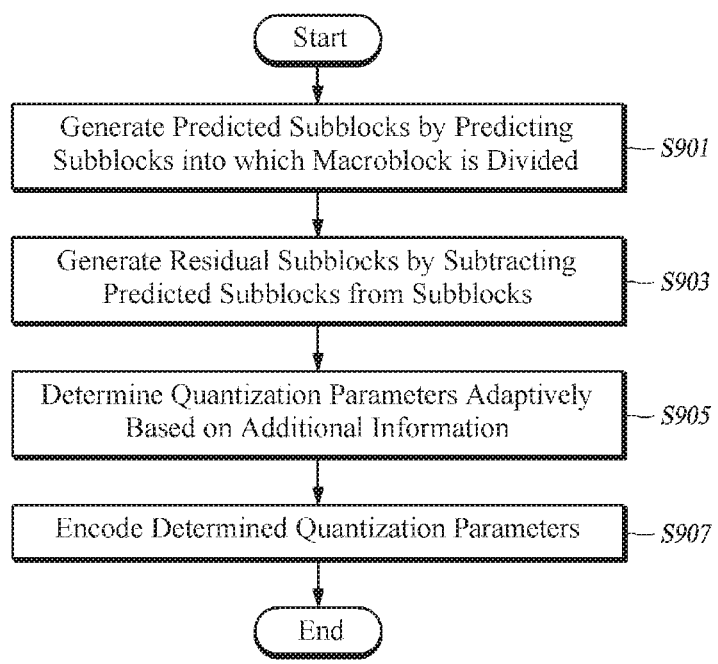
FIG. 9 is a flow diagram of a method of encoding a video by the video encoding apparatus of FIG. 1.

FIG. 9 is a flow diagram of a method of encoding a video by the video encoding apparatus of FIG. 1.

Referring to FIG. 9, the predictor 110 generates a predicted subblock by predicting subblocks into which an extended macroblock is divided (S901). The subtracter 120 generates a residual subblock by subtracting a generated predicted subblock from a subblock divided by the predictor 110 (S903). The transformer/quantizer 130 generates a quantized transform coefficient by transforming/quantizing the residual subblock according to a size of the subblock, and determines a quantization parameter based on additional information about the subblock and the extended macroblock (S905).

The encoder 140 may encode the quantization parameter by using additional information including at least one of SKIP mode information, CBP information, and CBPX flag information on the subblock and the extended macroblock. In addition, if an encoding block pattern of a current block is not 0, the encoder 140 may encode the quantization parameter in units of the current block. In addition, if the encoding block pattern of the current block is not 0, the encoder 140 may encode the quantization parameter in units of each subblock based on additional information of each subblock in the current block. In addition, the encoder 140 may sequentially encode the quantization parameters of the subblocks in the current block. In addition, if the encoding modes of the subblocks in the extended macroblock are different from each other, the encoder 140 may encode at least one quantization parameter for the respective encoding modes. In addition, if the extended macroblock is divided into subblocks and the subblock is divided into lower subblocks prior to encoding, the encoder 140 may encode a representative value of quantization parameters for the lower subblocks of the subblock.

The encoder 140 generates encoded data by entropy-encoding a quantized transform coefficient (S907). In addition, if an encoding block pattern of the current block is not 0, the encoder 140 may encode the quantization parameter in units of the current block. In addition, if the current block is an inter prediction encoding mode, and if the current block is a SKIP mode, the encoder 140 may skip the determining or encoding of the quantization parameter.

In addition, if the encoding block pattern of the current block is not 0, and if an encoding block pattern of the ith subblock in the current block is not 0, the encoder 140 may encode the quantization parameter in units of the ith subblock.

Figure 10:
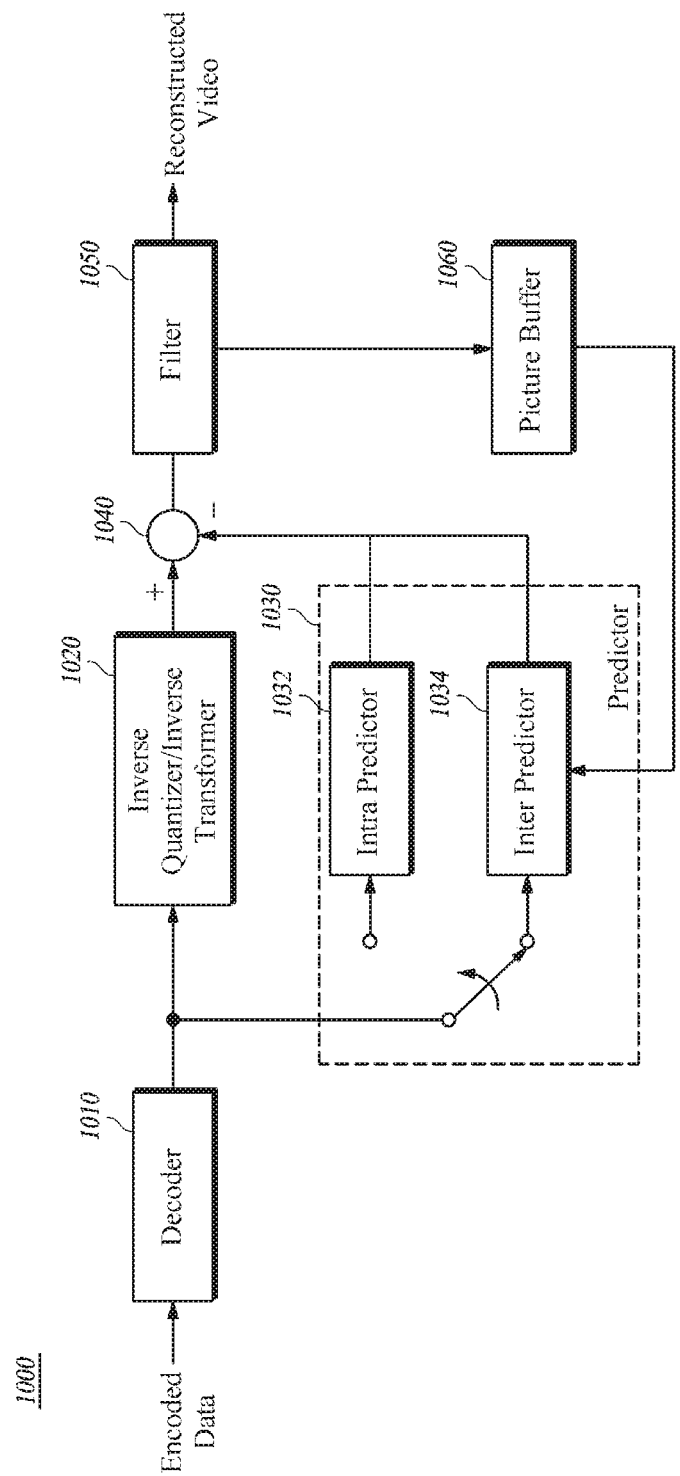
FIG. 10 is a block diagram of a schematic configuration of a video decoding apparatus according to at least one embodiment of the present disclosure.
Figure 11:
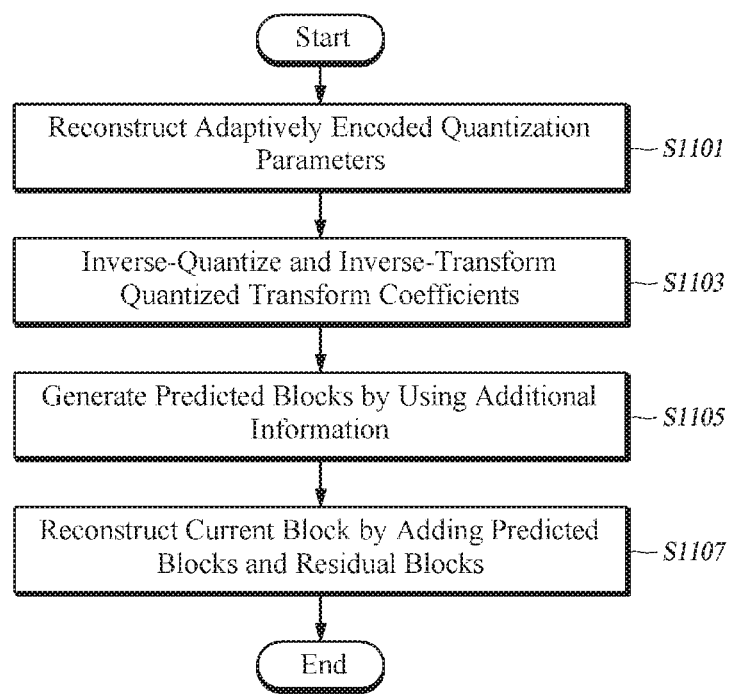
FIG. 11 is a flow diagram of a method of decoding a video by the video decoding apparatus of FIG. 10.

FIG. 10 is a block diagram of a schematic configuration of a video decoding apparatus according to at least one embodiment of the present disclosure, and FIG. 11 is a flow diagram of a method of decoding a video by the video decoding apparatus of FIG. 10.

A video decoding apparatus 1000 according to at least one embodiment of the present disclosure may include a decoder 1010, an inverse quantizer/inverse transformer 1020, a predictor 1030, and an adder 1040. In addition, the video decoding apparatus 1000 may further include a filter 1050 and a picture buffer 1060. Other components of the video decoding apparatus 1000, such as the decoder 1010, the inverse quantizer/inverse transformer 1020, the predictor 1030, and the adder 1040 comprise one or more processors and/or application-specific integrated circuits (ASICs) specified for respectively corresponding operation and functions described herein after. The video decoding apparatus 1000 further comprises input units (not shown in FIG. 10) such as one or more buttons, a touch screen, a mic and so on, and output units (not shown in FIG. 10) such as a display, an indicator and so on. The video encoding apparatus 100 further comprises communication modem(s) to receive and/or communication signals to thereby communicate with a video encoding apparatus through wire or wireless networks (herein, the wire or wireless networks include, for example, one or more network interfaces including, but not limited to, cellular, Wi-Fi, LAN, WAN, CDMA, WCDMA, GSM, LTE and EPC networks, and cloud computing networks).

The decoder 1010 reconstructs additional information and a quantized transform coefficient by decoding encoded data, and reconstructs a differential value of a quantization parameter that is determined and encoded adaptively based on additional information of a current block (S1101). The differential value of the quantization parameter refers to a differential value between a quantization parameter value of an extended macroblock encoded by the video encoding apparatus 100 and a quantization parameter value of a subblock in the extended macroblock. Herein, if an encoding block pattern of the current block is not 0, the decoder 1010 may decode the differential value of the quantization parameter in units of the current block. In addition, if the current block is an inter prediction encoding mode, and if the current block is a SKIP mode, the decoder 1010 may skip the decoding of the quantization parameter. In addition, if the encoding block pattern of the current block is not 0, and if an encoding block pattern of the ith subblock in the current block is not 0, the decoder 1010 may decode the differential value of the quantization parameter in units of the ith subblock.

Herein, the decoder 1010 may be configured to decode a size of a minimum subblock for reconstructing the quantization parameter from a sequence header or a slice header.

In addition, the decoder 1010 may be configured to predict a quantization parameter of the current block by using a quantization parameter of a previously decoded left or upper side block of the current block or a quantization parameter of a block that is previous in a decoding sequence.

The inverse quantizer/inverse transformer 1020 reconstructs a residual block by inverse-quantizing and inverse-transforming a quantized transform coefficient (S1103).

The predictor 1030 generates a predicted block by using reconstructed additional information of the current block (S1105). A predicted block generating method of the predictor 1030 is the same as that of the predictor 110 of the video encoding apparatus 100.

The adder 1040 reconstructs the current block by adding the predicted block and the residual block (S1107).

According to various embodiments of the present disclosure as described above, one or more quantization parameters is able to be used adaptively for an extended macroblock to be encoded or decoded, so that the encoding and/or decoding efficiency of each subblock can be maximized. In addition, according to various embodiments of the present disclosure, a more efficient and sophisticated algorithm is able to be easily achieved for development of a bit allocation and control technology for video coding.

Although exemplary embodiments of the present disclosure have been described for illustrative purposes, those of ordinary skill in the art will appreciate that various modifications, additions and substitutions are possible, without the spirit and scope of the claimed invention. Specific terms used in this disclosure and drawings are used for illustrative purposes and not to be considered as limitations of the present disclosure. Therefore, exemplary embodiments of the present disclosure have not been described for limiting purposes. Accordingly, the scope of the claimed invention is not to be limited by the above aspects but by the claims and the equivalents thereof.

What is claimed is:

1. A video decoding apparatus, comprising:
a decoder, implemented by one or more processors, configured to
determine a size of a minimum block unit among block units in which quantization parameter information is decoded from a bitstream,
determine a current block to be decoded by dividing a block larger than 16×16 into one or more blocks,
decode, from the bitstream, a skip information indicating whether or not the current block has been encoded by using a skip mode, wherein the skip mode is a mode where no more other information related to the current block is encoded into the bitstream except motion information for deriving a motion vector of the current block,
decode, from the bitstream, the motion information for deriving the motion vector of the current block without decoding information on residual signals of the current block, when the skip information indicates that the current block has encoded using the skip mode, and
decode, from the bitstream, prediction information of the current block and quantized transform coefficients of the current block, when the skip information indicates that the current block has not been encoded using the skip mode; and
a video reconstructor, implemented by one or more processors, configured to
determine the motion vector of the current block using the decoded motion information and reconstruct, as the current block, a predicted block predicted using the motion vector of the current block, when the skip information indicates that the current block has encoded using the skip mode, and reconstruct residual signals from the quantized transform coefficients by inversely quantizing the quantized transform coefficients using a quantization parameter and reconstruct the current block based on the prediction information and the reconstructed residual signals, when the skip information indicates that the current block has not been encoded using the skip mode, wherein, when a size of the current block is equal to or greater than the size of the minimum block unit, the quantization parameter is obtained by decoding, from the bitstream, quantization parameter information dedicated to the current block, when the size of the current block is less than the size of the minimum block unit, the quantization parameter is obtained by decoding, from the bitstream, quantization parameter information applicable to all blocks in the minimum block unit in which the current block is included.

2. The apparatus of claim 1, wherein the motion information of the current block is information on a predicted motion vector of the current block derived from neighboring blocks, wherein the predicted motion vector is set as the motion vector of the current block.

3. The apparatus of claim 1, wherein, when the size of the current block is less than the size of the minimum block unit, the current block shares the quantization parameter information with the other blocks in the minimum block unit in which the current block is included.

4. The apparatus of claim 1, wherein the decoder is further configured to decode information on the size of the minimum block unit from the bitstream, and determine the size of the minimum block unit based on the information on the size of the minimum block unit.

5. The apparatus of claim 4, wherein the information on the size of the minimum block unit is decoded from a header information containing information related to a picture in which the current block is located.

6. The apparatus of claim 5, wherein the information on the size of the minimum block is decoded in the unit of sequences or slices.

7. The apparatus of claim 1, wherein, when the size of the current block is less than the size of the minimum block unit, the decoder is configured to decode the quantization parameter information only in the case that the current block is the first block in a decoding order among blocks in the minimum block unit.

8. The apparatus of claim 1, wherein the quantization parameter information is a delta quantization parameter which is a difference between the quantization parameter of the current block and a predicted value thereof.

9. The apparatus of claim 8, wherein the predicted value is calculated using quantization parameters of both a left side block of the current block and an upper side block of the current block.

10. The apparatus of claim 1, wherein the size of the current block is determined among sizes ranging from 8×8 to 64×64.

11. The apparatus of claim 1, the decoder is further configured to decode, from the bitstream, coded block information indicating whether the current block or each of subblocks divided from the current block has non-zero transform coefficients, when the skip information indicates that the current block has not been encoded using the skip mode.

* * * * *